(12) United States Patent
Cudak et al.

(10) Patent No.: US 10,394,442 B2
(45) Date of Patent: Aug. 27, 2019

(54) ADJUSTMENT OF USER INTERFACE ELEMENTS BASED ON USER ACCURACY AND CONTENT CONSUMPTION

(71) Applicant: International Business Machines Corporation, Armonk, NY (US)

(72) Inventors: Gary D. Cudak, Creedmoor, NC (US); Christopher J. Hardee, Raleigh, NC (US); Adrian X. Rodriguez, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 240 days.

(21) Appl. No.: 14/078,899

(22) Filed: Nov. 13, 2013

(65) Prior Publication Data
US 2015/0135089 A1    May 14, 2015

(51) Int. Cl.
G06F 3/048    (2013.01)
G06F 3/0488   (2013.01)
G06F 3/041    (2006.01)

(52) U.S. Cl.
CPC .......... *G06F 3/0488* (2013.01); *G06F 3/0418* (2013.01)

(58) Field of Classification Search
None
See application file for complete search history.

(56) References Cited

U.S. PATENT DOCUMENTS

2005/0159949 A1* 7/2005 Yu ................... G10L 15/065
                                                704/235
2008/0055259 A1   3/2008 Plocher
2010/0039618 A1* 2/2010 De Lemos ........... A61B 3/113
                                                351/209
2010/0161522 A1* 6/2010 Tirpak ................. G06F 3/016
                                                706/11
2010/0188371 A1   7/2010 Lowles et al.
(Continued)

FOREIGN PATENT DOCUMENTS

EP    1923779 A2    5/2008
GB    2468891 A     9/2010
(Continued)

OTHER PUBLICATIONS

Harrison, C., et al.; Providing Dynamically Changeable Physical Buttons on a Visual Display; CHI 2009, Apr. 4-9, 2009, Boston MA, copyright 2009, pp. 299-308.
(Continued)

*Primary Examiner* — William C Trapanese
(74) *Attorney, Agent, or Firm* — Cantor Colburn LLP; Joseph Petrokaitis

(57) ABSTRACT

Systems and methods for adjusting user interface elements based on user accuracy and content consumption are disclosed. According to an aspect, a method includes receiving user input for interacting with one or more elements presented by a user interface. The method also includes determining an estimate of user accuracy for correctly selecting the one or more elements. Further, the method includes determining a rate of consumption of content presented by the user interface. The method also includes adjusting one of a position and size of at least one of the elements based on the estimate of user accuracy and the rate of consumption of content.

17 Claims, 4 Drawing Sheets

(56) References Cited

U.S. PATENT DOCUMENTS

| | | | |
|---|---|---|---|
| 2010/0302212 A1 | 12/2010 | Weber et al. | |
| 2011/0050732 A1* | 3/2011 | Arrasvuori | G06F 17/30241 |
| | | | 345/666 |
| 2012/0154313 A1 | 6/2012 | Au et al. | |
| 2012/0169613 A1* | 7/2012 | Armstrong | G06F 3/0233 |
| | | | 345/173 |
| 2012/0188285 A1 | 7/2012 | Friedlander et al. | |
| 2012/0249596 A1 | 10/2012 | Colley | |
| 2012/0319983 A1 | 12/2012 | Bao et al. | |
| 2013/0120278 A1* | 5/2013 | Cantrell | G06F 3/04886 |
| | | | 345/173 |
| 2013/0145304 A1* | 6/2013 | DeLuca | G06F 3/013 |
| | | | 715/781 |
| 2013/0201159 A1 | 8/2013 | Inamoto | |

FOREIGN PATENT DOCUMENTS

| | | |
|---|---|---|
| JP | 2009129449 A | 6/2009 |
| JP | 2011243157 A | 12/2011 |
| WO | 2008059495 A2 | 5/2008 |
| WO | 2011033519 A1 | 3/2011 |
| WO | 2011058528 A1 | 5/2011 |

OTHER PUBLICATIONS

Gunawardana, Asela, et al; "Usability guided key-target resizing for soft keyboards." In Proceedings of the 15th international conference on Intelligent user interfaces, IUT 10, Feb. 7-10, 2010, Hong Kong, China, pp. 111-118. ACM, 2010.

Leahy, M., et al., "Effect of touch screen target location on user accuracy", In Proceedings of Human Factors Society Annual Conference, TR 90-48, 1990, Orlando, FL.

Jin, Zhao Xia et al., "Touch Screen User Interfaces for Older Adults: Button Size and Spacing", C. Stephanidis (Ed.): Universal Access in HCI, Part I, HCII 2007, LNCS 4554, pp. 933-941, 2007 © Springer-Verlag Berlin Heidelberg.

Brewster, Stephen A., "Overcoming the Lack of Screen Space on Mobile Computers", University of Glasgow, Personal and Ubiquitous Computing 6(3):pp. 188-205, 2002.

Sun, Xianghong et al., "An Empirical Study on the Smallest Comfortable Button/Icon Size on Touch Screen", N. Aykin (Ed.): Usability and Internationalization, Part I, HCII 2007, LNCS 4559, pp. 651-621, 2007 © Springer-Verlag Berlin Heidelberg.

Potter, Richard L. et al., "Improving the Accuracy of Touch Screens: An Experimental Evaluation of Three Strategies", CHI '88; ACM 1988; pp. 27-32.

* cited by examiner

ADJUSTMENT OF USER INTERFACE ELEMENTS BASED ON USER ACCURACY AND CONTENT CONSUMPTION

BACKGROUND

Field of the Invention

The present invention relates to computing device user interfaces, and more specifically, to systems and methods for adjustment of user interface elements based on user accuracy and content consumption.

Description of Related Art

Many computing devices, such as tablet computers and smartphones, have displays that incorporate dynamic user interfaces for both content and touch display interaction. For example, some computing devices may utilize a portion of a display for touch display user-interfacing, such as an on-screen virtual keyboard. Another portion of the display may be used for content display, such as for display of a text message being typed into the computing device or for the display of an image or video.

Displays on some computing devices have very limited area for displaying content and elements with which users can interact for user input to the device. There is an advantage for maximizing the area available for content, such as images and video. However, interactive elements can be difficult to use if they are too small for a user. As a result, a user may interact with such elements inaccurately and therefore make errors in entering input to the device. As a result, there is a need for providing improved techniques for adjusting element size and positions on computing device displays.

BRIEF SUMMARY

In accordance with one or more embodiments of the present invention, systems and methods for adjusting user interface elements based on user accuracy and content consumption are provided. According to an aspect, a method includes receiving user input for interacting with one or more elements presented by a user interface. The method also includes determining an estimate of user accuracy for correctly selecting the one or more elements. Further, the method includes determining a rate of consumption of content presented by the user interface. The method also includes adjusting one of a position and size of at least one of the elements based on the estimate of user accuracy and the rate of consumption of content.

DETAILED DESCRIPTION

As described herein, there are various embodiments and aspects of the present invention. According to embodiments, the present invention is directed to systems and methods for adjusting user interface elements based on user accuracy and content consumption.

Figure 1:
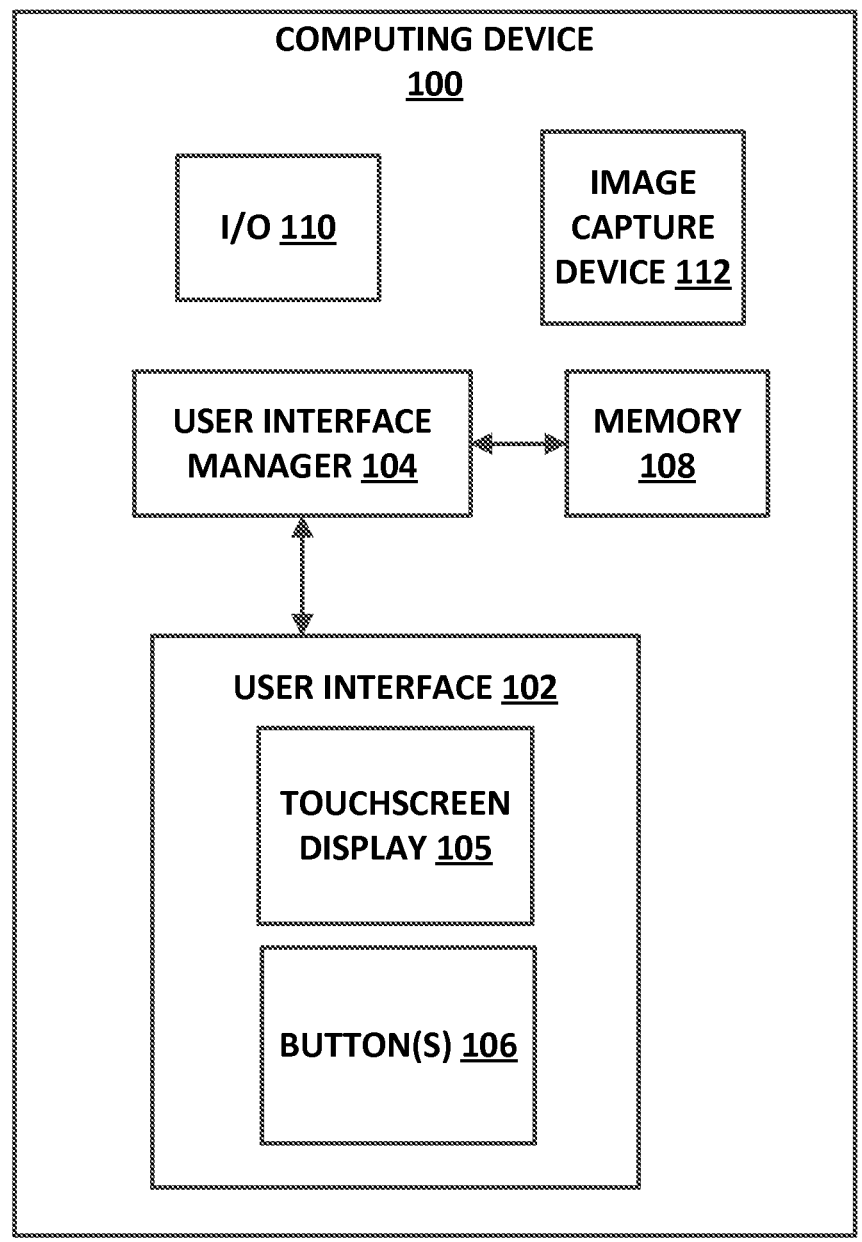
FIG. 1 is a block diagram of a computing device for adjusting user interface elements based on user accuracy and content consumption according to embodiments of the present invention.

Referring now to FIG. 1, the figure illustrates a block diagram of a computing device 100 for adjusting user interface elements based on user accuracy and content consumption according to embodiments of the present invention. Further, the computing device 100 may receive user input for interacting with one or more elements presented by a user interface, determine an estimate of user accuracy for correctly selecting the element(s), determine a rate of consumption of content presented by the user interface, and adjust one of a position and size of at least one of the elements based on the estimate of user accuracy and the rate of consumption of content according to embodiments of the present invention. Referring to FIG. 1, the computing device 100 may be a mobile device, which may include a user interface 102 being controllable by user interface manager 104. The user interface 102 may include a touchscreen display 105, one or more buttons 106, and/or the like. The mobile device 102 may also comprise a number of other functional components. This representation of the computing device 100 is meant to be for convenience of illustration and description, and it should not be taken to limit the scope of the present invention as one or more of the functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). For example, one or more functions may be implemented by a processor (not shown) and memory 108. The computing device 100 may include a graphics rendering engine for displaying information to the end user in the usual manner via the display 105. The computing device 102 may be Internet-accessible and can interact with a web server using known Internet protocols such as HTTP, HTTPS, and the like.

A wireless input/output (I/O) component 110 or any other suitable communication interface may be used for communicating data to other devices and for receiving communication data from other devices via a network as will be understood to those of skill in the art. The computing device 100 may include an antenna for wirelessly sending and receiving communications to, for example, a base station or any other suitable communications unit.

Figure 2:
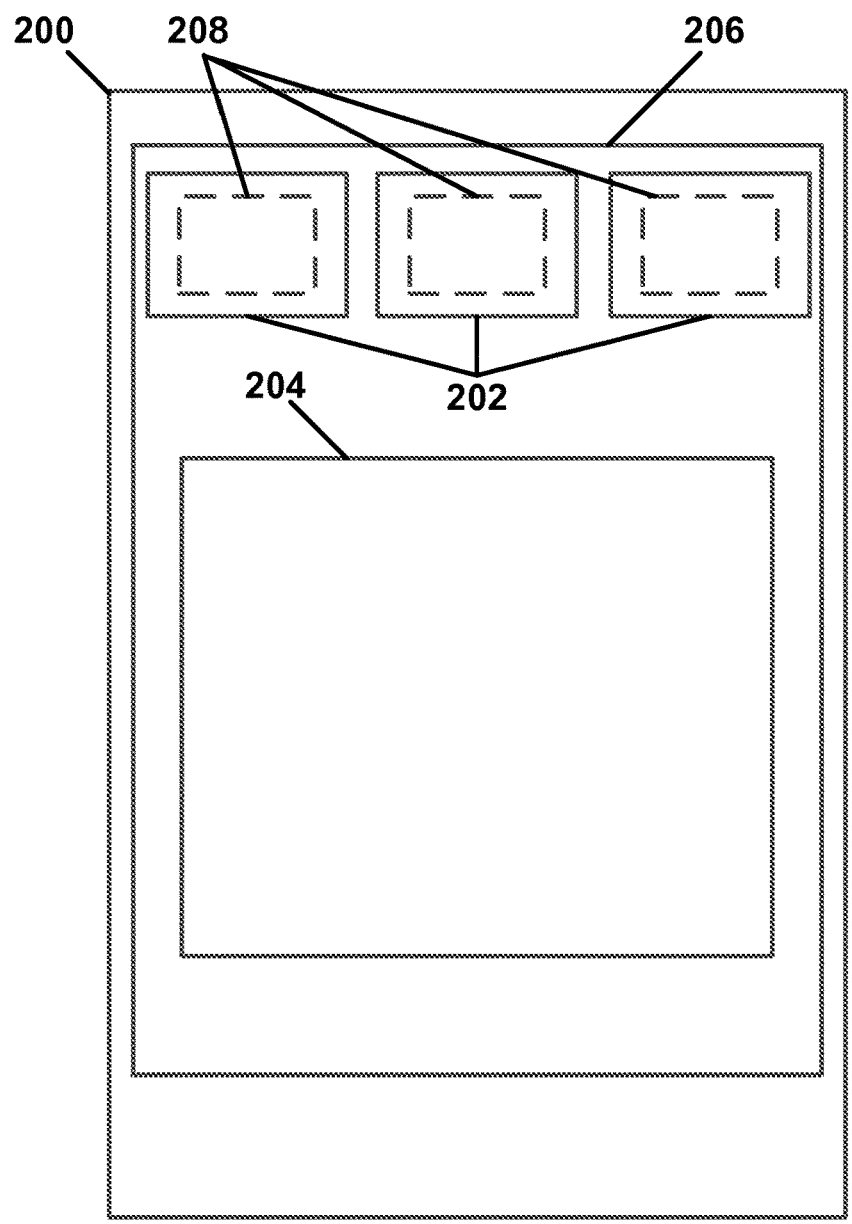
FIG. 2 is a screenshot of an example touchscreen display in accordance with embodiments of the present invention.

The operation of the computing device can be described by the following example. As shown in FIG. 1, the computing device 100 includes various functional components and an associated memory 108 to facilitate the operation. The operation of the disclosed methods may be implemented using system components other than as shown in FIG. 1. FIG. 2 illustrates a screenshot of an example touchscreen display 200 in accordance with embodiments of the present invention. Referring to FIG. 2, the display 200 may display multiple interactive elements 202 with which a user of the computing device may interact. For example, the elements 202 may be one of a display icon, a stylus, a mouse, or the like. The user may interact with an element 202 by touching a portion of a surface of the display 200 corresponding to the element. As an example, the elements 202 may each be a display icon representative of button for controlling display of content. In an example, content may be displayed in a window 204. The content may be text, video, and/or images. The user may touch a surface of the display corresponding to one of the elements 202 to input a command to go to the next part of the content. For example, the next part of the content may be additional text, video, or images following the currently displayed content. The elements 202 and window 204 containing the content may be displayed with a window 206 of an application presented by an application residing on the computing device.

A user interface manager, such as the user interface manager 104 shown in FIG. 1, may be in communication with the touchscreen display for receiving the user input for touching the surface of the display 200 corresponding to the element 202. The display 200 may be configured with circuitry suitable to detect the user touch of a portion or all of the surface of the element 202. The user interface manager may determine that the user intended to touch the element 202 and open the corresponding application in response to the determination.

In another example, multiple elements may represent keys of a virtual keyboard displayed on a display screen. The user may touch a portion of the screen corresponding to a key having a letter that he or she would like to input when entering text.

A user interface manager and/or touchscreen display may include control circuitry operable to receive a user input from a user interface 116, such as a touch display. The user input or signal may carry positional information indicative of the user input. In this regard, the position may include a position of the user input in a two-dimensional space, which may be relative to the surface of the touchscreen display. For example, the position may comprise a coordinate position relative to a two-dimensional coordinate system (e.g., an X and Y axis), such that the position may be determined. With this data, the user interface manager 104 may determine an instruction command that corresponds with an element displayed on the touchscreen display at the determined position or within a predefined proximity (e.g., within a predefined tolerance range) of the determined position. The user interface manager 104 may be further configured to perform a function or action related to the key corresponding to the instruction/command determined by the user interface manager 104 based on the position of the touch or other user input. An example of this function or action includes displaying a letter on the display screen, wherein the letter corresponds to a key at the determined position in which the user input originated.

The touchscreen display may be configured to enable the detection of a hovering gesture input. A hovering gesture input may include a gesture input to the touchscreen display without making physical contact with a surface of the touchscreen display, such as a gesture made in a space some distance above/in front of the surface of the touchscreen display. As an example, the touchscreen display may include a projected capacitive touch display which may be configured to enable detection of capacitance of a finger or other input object by which a gesture may be made without physically contacting a display surface. As another example, the touchscreen display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

Figure 3:
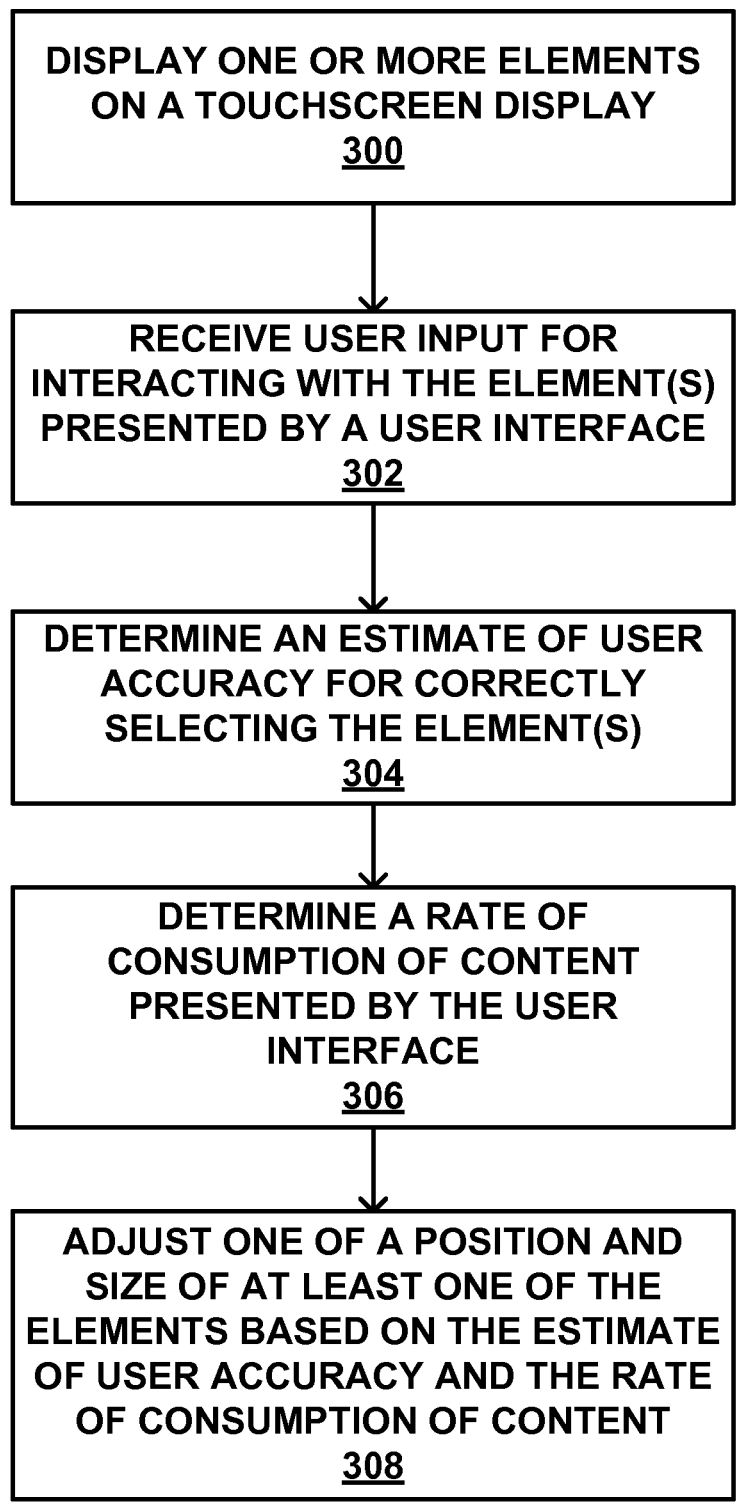
FIG. 3 is a flowchart of an example method of adjusting of user interface elements based on user accuracy and content consumption in accordance with embodiments of the present invention.

FIG. 3 illustrates a flowchart of an example method of adjusting of user interface elements based on user accuracy and content consumption in accordance with embodiments of the present invention. The example method is described as being implemented by the user interface manager 104 of the computing device 100 shown in FIG. 1, although it should be understood the method may be implemented by any suitable hardware, software, firmware, or combinations thereof on any suitable computing device. In addition in the examples, reference is made to the display 200 shown in FIG. 2, although it should be understood that the method may be implemented on any suitable display or user interface.

Referring to FIG. 3, the method includes displaying 300 one or more elements on a touchscreen display. For example, referring to FIG. 1, the user interface manager 104 may control the touchscreen display 105 to disclose one or more elements, such as the elements 202 shown in FIG. 2.

The method of FIG. 3 includes receiving 302 user input for interacting with one or more elements presented by the user interface. Continuing the aforementioned example, a computing device user may touch (e.g., with a finger or stylus) a surface of the display 200 one or more times for interacting with one or more of the elements 202. The touch input may be detected by the display 200 and position data of the touch may be communicated to a user interface manager, such as the user interface manager 104. Using the data, the user interface manager 104 may determine user touch with respect to the elements 202.

In another example, a user may interact with elements on the display by use of a mouse or other device that can interact with the displayed elements without physically touching the screen surface. The user may attempt to select one of the elements by placing a cursor on or near the element and "clicking" a button on the mouse. The position coordinate of the mouse at the time of the mouse click may be communicated to the user interface manager 104.

The method of FIG. 3 includes determining 304 an estimate of user accuracy for correctly selecting the element(s). Continuing the aforementioned example, the user interface manager 104 may estimate user accuracy based on a user input subsequent to the interaction with the element(s) of step 302. The subsequent user input may immediately follow the input of step 302 or soon afterward. The subsequent user input may be an input for reversing or changing a result of the selection of the element. For example, the subsequent user input may be a "go back" button for returning to a previous mode. The user interface manager 104 may determine that the user input was inaccurate in response to the "go back" button being used immediately subsequent to the user input of step 302 (e.g., within a predefined time period). The estimate may be a measure of a determined inaccurate user input. The measure may be of one or more determined inaccurate user inputs. The user interface manager 104 may determine a time between receipt of the user input of step 302 and receipt of the user input for reversing or changing the result of a selection. An inaccurate user input may be determined when the time is within a predetermined threshold (e.g., a time immediately following the first user input).

Further, for example, the inaccurate user input may be determined in response to it is also being determined that another element is also interacted with at the same time or about the same time as receipt of the user input of step 302. For example, a user may touch the surface of the display 200 shown in FIG. 2 such that areas corresponding to two of the elements 202 are touched either simultaneously or at about the same time. In this scenario, the user interface manager may determine which among the two elements 202 is considered selected. The other of the two elements 202 may be considered as not being selected. As an example, an element may be considered as an intended selection over another element based on a comparison of an amount of an area corresponding to one element that is touched in comparison to the other element. The element having the greater area touched may be considered the intended selection.

In accordance with embodiments of the present invention, the estimate of user accuracy may also be based on a user reaction to user input. For example, the mobile computing device 100 can include an image capture device 112 capable of capturing images and video. The computing device 100 can be positioned with respect to the user's face such that the image capture device 112 can capture one or more images or video of the user's face. The image(s) and/or video may be captured subsequent to receipt of the user input of step 302. The user interface manager 104 may be configured to analyze the captured image(s) and/or video data for determining a reaction of the user to entry of the user input. The user's reaction may be determined by the user interface manager 104 to indicate frustration, for example. In this instance, the user interface manager 104 may determine that the earlier user input was inaccurate and thus be used for estimating user accuracy.

The method of FIG. 3 includes determining 306 a rate of consumption of content presented by the user interface. Continuing the aforementioned example, the computing device 100 determine a rate of consumption of content based on a characteristic of content. For example, the window 204 shown in FIG. 2 may include text and/or images being presented to a user for user consumption or view. The user interface manager 104 may determine a characteristic of the content in the window 204 such as, for example, a font type and/or a font size of text within the window 204. In another example, the user interface manager 104 may determine a type of content such as whether the content is text, an image, or video. In another example, the rate of consumption of content may be determined based on a characteristic of an image, such as, for example, complexity of an image and whether an image is art or a photo.

In another example of determining a rate of consumption, the user interface manager 104 may determine a speed through content for use in determining the rate of consumption of the content. For example, the user interface manager 104 may determine advancement to other content, closing of a window (e.g., window 204) or content, or a speed or intervals of scrolling through content. These and other indicators of advancement through content may indicate a user's rate of consumption of content.

In another example of determining advance through content, the image capture device 112 may capture a video of the eyes of a user. The user interface manager 104 may determine eye movement of the user based on the captured video for eye tracking analysis. Further, the user interface manager 104 may determine that the user is scanning through and thus consuming content based on the analysis. In this way, the user interface manager 104 may determine a rate of consumption of content by the user.

The method of FIG. 3 includes adjusting 308 one of a position and size of one or more of the elements based on the estimate of user accuracy and the rate of consumption of content. Continuing the aforementioned example, the user interface manager 104 may control the display 105 to adjust a position and/or size of a displayed element based on estimated user accuracy and a rate of consumption of content. Referring to FIG. 2 for example, the user interface manager 104 may reduce the size of the elements 202 to the sizes indicated by broken-line boxes 208. In this way, more room on the display may be available for displaying other content. In another example, the elements 202 may be moved, such as in an upward direction or in another direction, for making more room available for a larger window 204.

The user interface manager 104 may adjust elements based on various measurements. For example, the user interface manager 104 may adjust a size and/or position of one or more elements based on a combination of the accuracy and consumption rate disclosed herein to optimize a user experience with the display. In an example, the user interface manager 104 may increase a size of an element in response to determining that a user has low accuracy for selecting user input. Conversely, the size of an element may be decreased in determining that the user accuracy is high. In another example, the user interface manager 104 may decrease a size of one or more elements in response to determining that the user content consumption rate is high.

Figure 4:
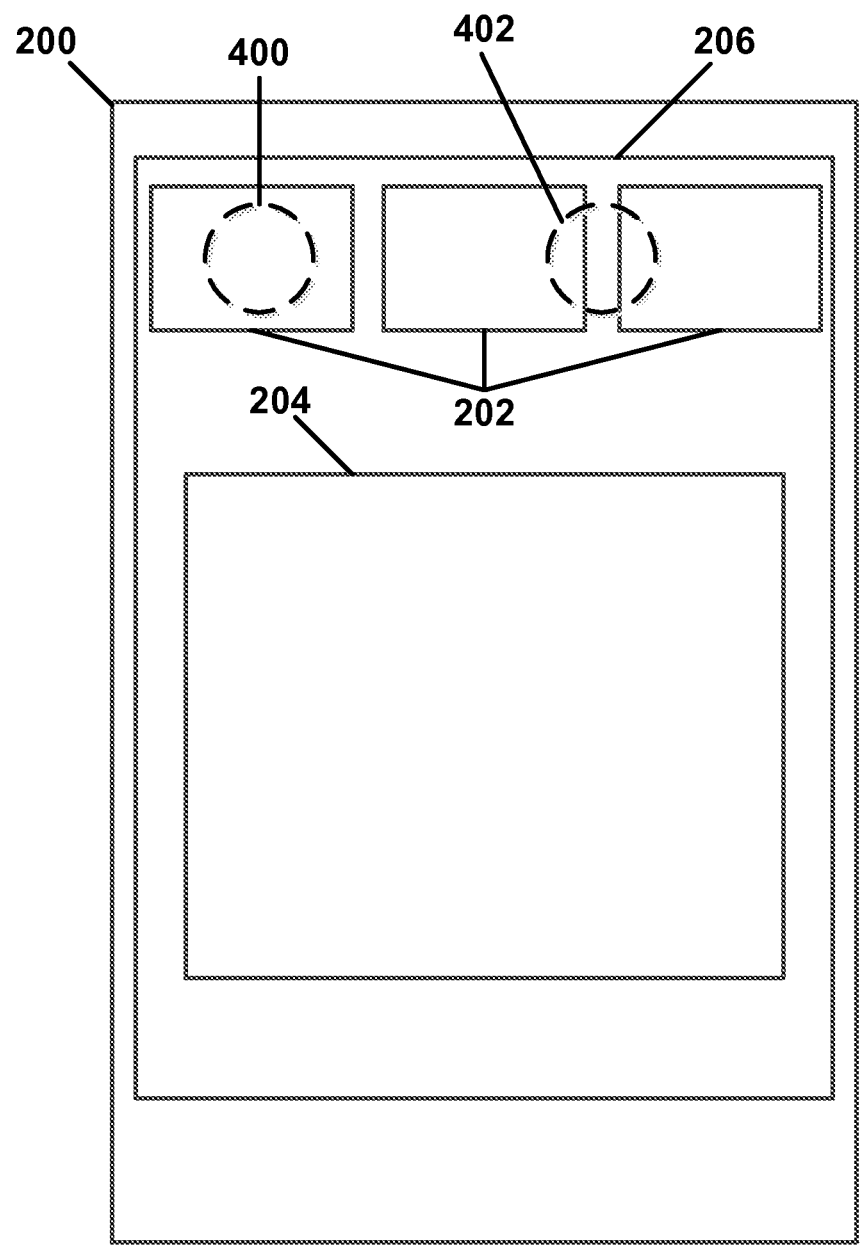
FIG. 4 is a screenshot of an example touchscreen display along with a depiction of accurate and inaccurate user inputs in accordance with embodiments of the present invention.

FIG. 4 illustrates a screenshot of an example touchscreen display 200 along with a depiction of accurate and inaccurate user inputs in accordance with embodiments of the present invention. Referring to FIG. 4, broken circle 400 depicts an area on the surface of the display 200 that a user has touched for an accurate input for selecting the corresponding element 202. In contrast, broken circle 402 depicts an area on the surface of the display 200 that a user has touched for an inaccurate input for selection of one of the elements 202 that overlap the area of the circle 402. The user interface manager 104 shown in FIG. 1 may determine that the touch corresponding to circle 400 was an accurate input based on it being located entirely within a user element. Regarding circle 402, the user interface manager 104 may determine that the touch corresponding to this circle was an inaccurate or less accurate input based on it being located partially within two elements 202. These determinations may be used for assessing or otherwise determining an estimate of user accuracy for correctly selecting elements in accordance with embodiments of the present invention. In an example, an error rate threshold may be set for the determination of how element size is to be adjusted based on a particular content consumption rate. The element may be changed to a predetermined size, and/or the element may be moved away from an expanding area of content.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving an initial user input for interacting with one or more elements presented by a user interface;
receiving a subsequent user input;
determining that the subsequent user input is an action reversing the initial user input;
determining a time between receipt of the initial user input and receipt of the subsequent user input;
determining an estimate of user accuracy using the determined time between the received initial user input and the received subsequent user input and a predetermined threshold;
determining a rate of consumption of content presented by the user interface, wherein determining the rate of consumption of content comprises analyzing eye movements of a user during the consumption of content;
using an image capture device to capture one or more images of a user subsequent to receipt of the initial user input;
determining user reaction to the initial user input based on the one or more images, wherein determining the estimate of user accuracy is based on the determined user reaction and wherein a determination that the reaction indicates frustration indicates a low level of user accuracy; and
adjusting a position and size of at least one of the elements based on a combination of both the estimate of user accuracy and the rate of consumption of content.

2. The method of claim 1, wherein the user interface is a component of a mobile computing device comprising at least one processor and memory.

3. The method of claim 1, wherein an element is one of a display icon, scrollbar, and image.

4. The method of claim 1, wherein receiving user input comprises receiving the user input from one of a touchscreen display, a stylus, and a mouse.

5. The method of claim 1, wherein receiving the initial user input comprises receiving an initial user input that interacts with at least a portion of first and second elements,
wherein the method further comprises determining that the first element is considered selected and the second element is not considered selected, and
wherein determining the estimate of user accuracy comprises determining the estimate of user accuracy based on the determination that the first element is considered selected and the second element is not considered selected.

6. The method of claim 1, wherein adjusting one of a position and size of the at least one of the elements comprises positioning the at least one of the elements at a different position on a display.

7. The method of claim 1, wherein adjusting one of a position and size of the at least one of the elements comprises one of increasing and decreasing a size of the at least one of the elements.

8. The method of claim 1, wherein the user interface is a touchscreen display, and
wherein the method further comprises displaying the one or more elements on the touchscreen display.

9. The method of claim 1, wherein the initial user input is received via the user interface via a first manner and the subsequent user input is received via the user interface via the first manner.

10. A computing device comprising:
at least a processor and memory;
a user interface; and
a user interface manager configured to:
receive an initial user input for interacting with one or more elements presented by the user interface;
receive a subsequent user input;
determine that the subsequent user input is an action reversing the initial user input;
determine a time between receipt of the initial user input and receipt of the subsequent user input;
determine an estimate of user accuracy using the determined time between the received initial user input and the received subsequent user input and a predetermined threshold;
determine a rate of consumption of content presented by the user interface based on analyzing eye movements of a user during the consumption of content;
use an image capture device to capture one or more images of a user subsequent to receipt of the initial user input;
determine a user reaction to the initial user input based on the one or more images, wherein determining the estimate of user accuracy is based on the determined user reaction and wherein a determination that the reaction indicates frustration indicates a low level of user accuracy; and
control the user interface to adjust a position and size of at least one of the elements based on a combination of the estimate of user accuracy and the rate of consumption of content.

11. The computing device of claim 10, wherein an element is one of a display icon, scrollbar, and image.

12. The computing device of claim 10, wherein the user interface comprises one of a touchscreen display, a stylus, and a mouse.

13. The computing device of claim 10, wherein the user interface is configured to receive the initial user input that interacts with at least a portion of first and second elements, and
wherein the user interface manager is configured to:
determine that the first element is considered selected and the second element is not considered selected; and
determine the estimate of user accuracy based on the determination that the first element is considered selected and the second element is not considered selected.

14. The computing device of claim 10, further comprising an image capture device configured to capture one or more images of a user subsequent to receipt of the initial user input, and
wherein the user interface manager is configured to:
determine user reaction to the initial user input based on the one or more images; and
determine the estimate of user accuracy based on the determined user reaction.

15. The computing device of claim 10, wherein the user interface manager is configured to control positioning of the at least one of the elements at a different position on a display based on the estimate of user accuracy and the rate of consumption of content.

16. The computing device of claim 10, wherein the user interface manager is configured to one of increase and decrease a size of the at least one of the elements based on the estimate of user accuracy and the rate of consumption of content.

17. The computing device of claim 10, wherein the initial user input is received via the user interface via a first manner and the subsequent user input is received via the user interface via the first manner.

* * * * *